United States Patent [19]

Kroninger, Jr. et al.

[11] 4,424,713
[45] Jan. 10, 1984

[54] SILICON DIAPHRAGM CAPACITIVE PRESSURE TRANSDUCER

[75] Inventors: Paul M. Kroninger, Jr., Harleysville; Paul J. Freud, Furlong; Dean P. Updike, Bethlehem, all of Pa.

[73] Assignee: General Signal Corporation, Stamford, Conn.

[21] Appl. No.: 387,397

[22] Filed: Jun. 11, 1982

[51] Int. Cl.³ .............................................. G01L 9/12
[52] U.S. Cl. ....................................... 73/718; 361/283
[58] Field of Search ................. 73/718, 724, 717, 720, 73/721, DIG. 4, 716, 706, 715; 361/283; 60/593; 92/49, 98 R

[56] References Cited

U.S. PATENT DOCUMENTS

| | | | |
|---|---|---|---|
| 4,158,311 | 6/1979 | Yasuhara et al. | 73/718 |
| 4,199,991 | 4/1980 | Kodama | 73/706 |
| 4,257,274 | 3/1981 | Shimada et al. | 73/718 |
| 4,261,086 | 4/1981 | Giachino et al. | 29/25.41 |
| 4,390,925 | 6/1983 | Freud | 73/718 |

*Primary Examiner*—Donald O. Woodiel
*Attorney, Agent, or Firm*—William G. Miller, Jr.; Harold Huberfeld

[57] ABSTRACT

A capacitive pressure transducer utilizing a plate of electrically conductive semi-conductor material sandwiched between a pair of plates of inorganic electrically insulating material and electrostatically bonded thereto. A pair of concentric circular recesses are etched in the plates in such a way as to form cavities on opposing sides of the conductive plate and to define a diaphragm area on that plate. Apertures are drilled through the insulating plates to expose the cavities to the pressures to be measured. The surfaces of the insulating plates in the cavities have deposited on them electrically conductive surfaces which form capacitors with the diaphragm area on the conductive plate. A stress relief area is provided on the high pressure side surrounding the diaphragm area. In that stress relief area, the conductive plate is unrestrained by the adjacent insulating plate. Provision of this stress relief makes it possible to extend the pressure range of the transducer beyond the range which would normally be useful for the dimensions of the particular transducer.

14 Claims, 3 Drawing Figures

SILICON DIAPHRAGM CAPACITIVE PRESSURE TRANSDUCER

BACKGROUND OF THE INVENTION

This invention relates to a variable capacitance pressure transducer of the type which utilizes a plate of electrically conductive semi-conductor material, such as silicon, as a diaphragm material. This conductive plate is sandwiched between a pair of plates of inorganic electrically insulating material, such as borosilicate glass, with the plates being electrostatically bonded together to form the transducer. Silicon-diaphragm transducers of this construction typically have a pair of concentric circular recesses etched in the opposite faces of the silicon plate or, alternatively, in the surfaces of the glass plates so as to form cavities on opposing sides of the silicon plate to define a diaphragm area on that plate. Circular, thin-film metallic deposits are laid on the surface of the glass plates in the cavities so that the deposits form capacitors with the diaphragm.

When the cavities are exposed to different pressures, the diaphragm deflects and increases the electrical capacity on one side while decreasing the electrical capacity on the other side. Thus, it is possible with a measuring circuit responsive to those changes in electrical capacity to obtain a pressure difference measurement. This measurement may be a measure of gage pressure when one cavity is exposed to the ambient pressure or it may be what is termed a pressure difference measurement when cavities on opposite sides of the diaphragm are both exposed to process pressures.

Pressure transducers such as described above are shown in U. S. Pat. No. 4,257,274-Shimada et al, issued on Mar. 24, 1981. A method for producing pressure transducers of this type is described in U.S. Pat. No. 4,261,086 issued to Giachino on Apr. 14, 1981.

The pressure range of pressure differences which can be measured by devices of the type described above is determined by the diameter of the diaphragm area and the diaphragm thickness. For a fixed diameter of the diaphragm area, the range can be increased by increasing the thickness of the diaphragm. As the range increases, the forces acting on the diaphragm increase in proportion to the pressure times the diaphragm area. A pressure will be reached where those forces exceed the material strength. In order to avoid failure, the choice of dimensions for the cavity and the diaphragm will normally be made by specifying first a cavity diameter small enough to contain the pressure being measured and second, the thickness of the diaphragm is chosen to give the desired diaphragm deflections for the pressure range being measured. It is, of course, desirable to extend the pressure range of these devices as much as possible to provide units which are broadly applicable.

The inventors have noticed that upon exposure of pressure transducers of this type to excessive pressure differences, failure of the transducer occurs as a result of excessive diaphragm deflections, which causes radial cracking of the glass plate on the high pressure side. It is therefore an object of the present invention to prevent the formation of such cracks in the pressure range in which they normally develop and thereby extend the pressure range of this type of transducer.

SUMMARY OF THE INVENTION

A capacitive pressure transducer is provided which utilizes a plate of electrically conductive semi-conductor material sandwiched between a pair of plates of inorganic electrically insulating material and electrostatically bonded thereto. A pair of concentric circular recesses are etched in the plates in such a way as to form cavities on opposing sides of the conductive plate and to define a diaphragm area on that plate. Apertures are drilled through the insulating plates to expose the cavities to the pressures to be measured. The surfaces of the insulating plates in the cavities have deposited on them electrically conductive surfaces which form capacitors with the diaphragm area on the conductive plate. A stress relief area is provided on the high pressure side surrounding the diaphragm area. In that stress relief area, the conductive plate is unrestrained by the adjacent insulating plate. Provision of this stress relief makes it possible to extend the pressure range of the transducer beyond the range which would normally be useful for the dimensions of the particular transducer.

DESCRIPTION OF THE PREFERRED EMBODIMENTS

Figure 1:
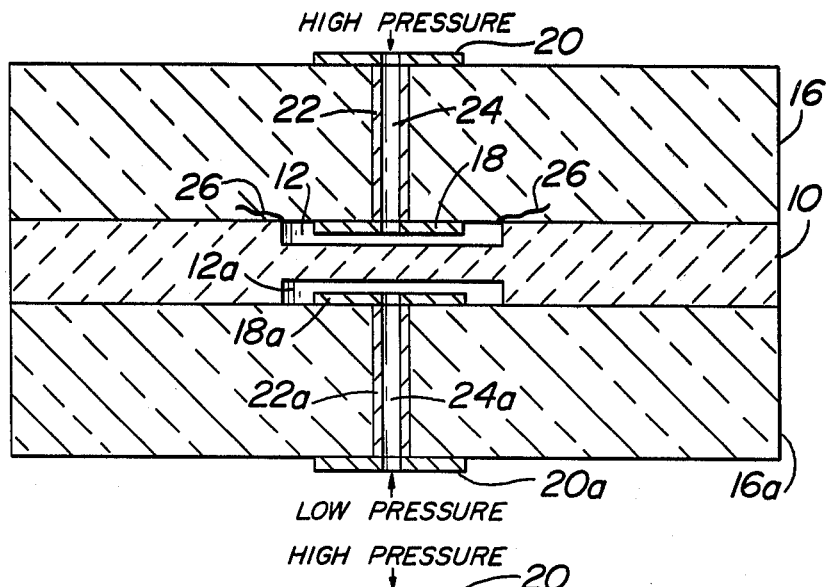
FIG. 1 is a cross-section of a capacitive pressure transducer of the type found in the prior art showing the area at which failure by cracking occurs under overpressure conditions.

Referring to FIG. 1, the pressure transducer structure shown utilizes a plate 10 of electrically conductive semi-conductor material such as single crystal silicon, sandwiched between a pair of plates 16 and 16a of inorganic electrically insulating material, such as borosilicate glass. The silicon plate is electrostatically bonded between the borosilicate glass plates along the entire interface. In accordance with the electrostatic bonding procedure set forth in U.S. Pat. No. 3,397,278, issued to Pomerantz on Aug. 13, 1968, this bonding process provides a bond between the glass plates and the silicon plate which approaches the strength of those materials themselves.

The silicon plate has circular recesses 12 and 12a etched into its opposite faces to form a diaphragm area in the silicon plate. This area is the area of reduced cross-section and is that portion of the silicon plate which will be deflected when exposed to a pressure difference.

Each of the glass plates 16 and 16a has a corresponding circular thin metal film 18 and 18a deposited on that surface of the glass plate facing the recesses 12 and 12a in the silicon plate. Each of these thin film deposits 18 and 18a is connected to one of the thick film deposits 20 and 20a, respectively. An interconnecting thin film deposit 22 and 22a is laid on the surface of the respective apertures 24 and 24a in the glass plates.

It will be evident that each of the deposits 18 and 18a forms a plate of a capacitor, the other plate of which is the diaphragm area of the silicon plate 10. Thus, when a high pressure is introduced into the centrally located aperture 24 and a lower pressure is introduced into the other centrally located aperture 24a, the diaphragm area of the silicon plate 10 will deflect in a downward direction. This changes the capacity between the deposit 18 and the plate 10 as well as between deposit 18a and the plate 10. These capacity changes are in opposite direction and may be utilized in a bridge circuit, for example, to measure the pressure difference across the diaphragm. For this purpose, separate electrical connections can be made to the deposit 20 as well as the deposit 20a and the plate 10.

When the high pressure introduced through aperture 24 exceeds the low pressure introduced through aperture 24a by an amount which is excessive for the dimensions and material of the transducer, the deflections of the diaphragm area of the silicon plate 10 in combination with the strong bonding along the interface as provided by the electrostatic bonding procedure, causes the glass plate 16 on the high pressure side of the transducer to fail in tension as by the formation of radial cracks 26 in the glass plate. This cracking starts near the silicon-glass interface at the outside edge of the etched recess in the silicon and separates radially with increasing pressure. The crack is the result of the tensile reaction stresses developed in the glass by the flexing of the silicon diaphragm. The crack growth stops when sufficient tensile stresses in the glass plate on the high pressure side have been converted into compressive reaction stresses in the glass plate on the low pressure side. Since glass is much stronger in compression than in tension, the device can continue to function without further failure at a reduced full scale design pressure.

It is, of course, desirable to design the transducer for a particular full scale pressure, and therefore it is beneficial to be able to utilize the transducer in pressure ranges which would normally cause the above mentioned cracks to be produced without, however, having to accommodate the decrease in design pressure resulting from these cracks. To this end there is provided by this invention a stress relief area surrounding the diaphragm area so there will be no restraint on deflection of the silicon plate by that portion of the glass plate on the high pressure side which is just adjacent to the recess, or, in other words, in that area surrounding the diaphragm area where cracking would be expected.

Figure 2:
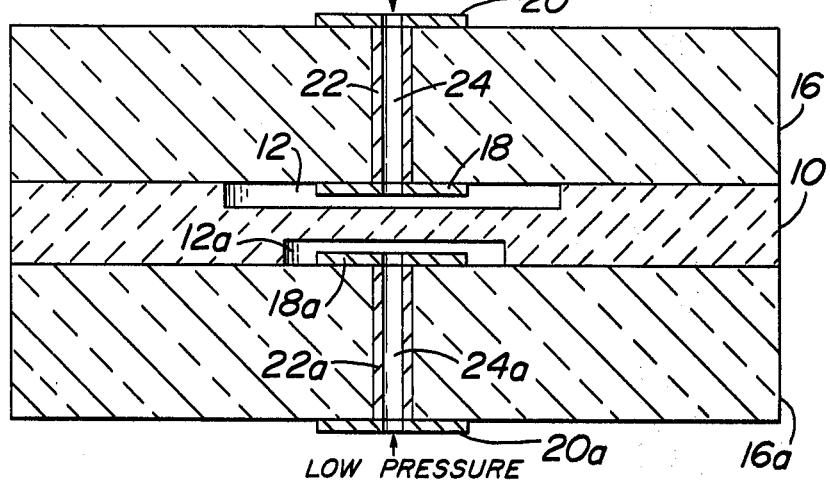
FIG. 2 is a cross-section of a capacitive pressure transducer showing one form of the present invention.

One form of the present invention which provides the necessary stress relief is shown in FIG. 2 wherein the etched recess on the high pressure side of the silicon plate 10 is increased in diameter. This increase in diameter may, for example, be of a magnitude such that the diameter of the recess 12 on the high pressure side approximates 1.3 to 1.5 times the diameter of recess 12a on the low pressure side. It has been found that with such an increase in diameter on the high pressure side, the transducer will not fail by fractures in the glass but instead is limited by the strength of the silicon diaphragm.

Figure 3:
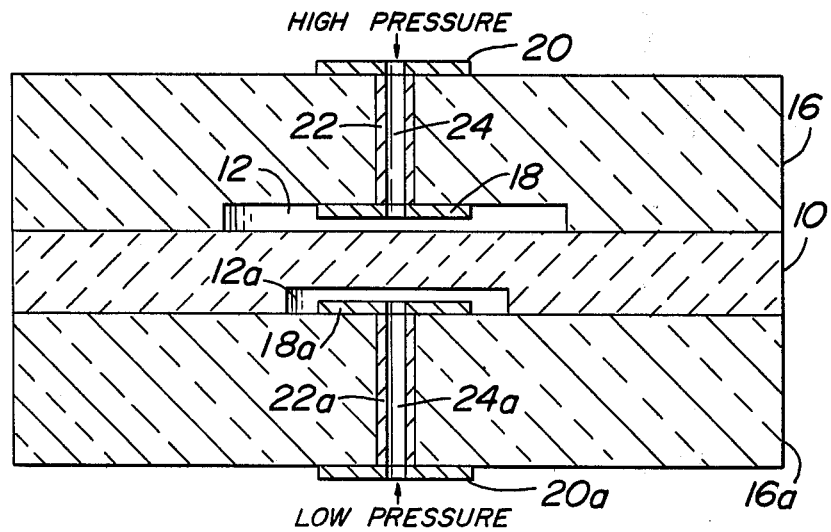
FIG. 3 is a cross-section of a capacitive pressure transducer showing another form of the present invention.

Another form of the present invention is shown in FIG. 3 wherein the stress relief is provided by etching a recess in the glass plate on the high pressure side of the transducer while omitting any etched recesses in the silicon plate on that side. These recesses should, as mentioned with regard to FIG. 2, be on the order of 1.3 to 1.5 times the diameter of the recesses on the low pressure side to avoid cracking in the glass plate.

It will, of course, be evident to those skilled in the art that the recess on the low pressure side of the diaphragm may be etched into the glass rather than into the silicon plate. Thus, both recesses may be etched either into the silicon plate or into the respective glass plates or, alternatively, one of the recesses may be etched into the glass and one into the silicon. Still another variation of the present invention is provided by preventing the electrostatic bonding over that area of interface between the plate 16 and the plate 10 on the periphery of the recess 12 where the cracking would normally occur. By preventing the bonding from occurring in that area cracking is avoided, for that area of the silicon plate will be unrestrained by the glass plate 16. Thus, there is provided the necessary stress relief in avoidance of cracking upon the application of overpressure conditions.

What is claimed is:

1. In a pressure transducer of the capacitor type in which a plate of electrically conductive semi-conductor material is sandwiched between a pair of plates of inorganic electrical insulating material electrostatically bonded thereto, wherein a pair of concentric circular recesses are etched in said plates to form cavities on opposing sides of said conductive plate to define a diaphragm area on said conductive plate, apertures are drilled through said insulating plates, and the surfaces of one of said insulating plates in said cavities has deposited thereon an electrically conductive film forming a capacitor with the diaphragm area of said conductive plate, the improvement comprising:
a stress relief area surrounding said diaphragm area so that deflection of said conductive plate is unrestrained by the adjacent insulating plate on the high pressure side for prevention of overpressure failure of said transducer.

2. Apparatus as set forth in claim 1 in which the cavities are formed by circular recesses etched into opposite faces of the conductive plate and said stress relief is provided by having the diameter of the recess on the high pressure side greater than the diameter of the recess on the low pressure side.

3. Apparatus as set forth in claim 1 in which the cavity on the high pressure side is formed by a recess in the insulating plate on that side and the stress relief is provided by providing said recess on the high pressure side with a diameter greater than that of the recess on the low pressure side.

4. Apparatus as set forth in claim 1, 2, or 3 in which said conductive plate is made of single crystal silicon and said insulating plates are made of borosilicate glass.

5. Apparatus as set forth in claims 2 or 3 in which the recess on the high pressure side is at least 1.3 times the diameter of the recess on the low pressure side.

6. Apparatus as set forth in claim 1 in which the stress relief is provided by providing an unbonded region in the interface between the insulating plate on the high pressure side and the conductive plate, said region being peripheral to the cavity on the high pressure side.

7. Apparatus as set forth in claim 6 in which the unbonded region extends to a diameter which is more than 1.3 times the diameter of the cavity on the low pressure side.

8. In a pressure transducer of the type having a first plate sandwiched between a pair of plates bonded thereto, wherein said plates have a pair of concentric circular recesses forming cavities on opposing sides of said first plate to define a diaphragm area on said first plate, and wherein said cavities are exposed to the pressures to be compared, the improvement comprising:
a stress relief area surrounding said diaphragm area on the high pressure side of said first plate so that deflection of said first plate is unrestrained by the adjacent plate for prevention of overpressure failure of said transducer.

9. Apparatus as set forth in claim 8 in which the cavities are formed by circular recesses etched into opposite faces of said first plate and said stress relief is provided by having the diameter of the recess on the high pressure side greater than the diameter of the recess on the low pressure side.

10. Apparatus as set forth in claim 8 in which the cavity on the high pressure side is formed by a recess in that one of said pair of plates on the high pressure side and the stress relief is provided by providing said recess on the high pressure side with a diameter greater than that of the recess on the low pressure side.

11. Apparatus as set forth in claim 8, 9, or 10 in which said first plate is made of single crystal silicon and said pair of plates are made of borosilicate glass.

12. Apparatus as set forth in claim 9 or 10 in which the recess on the high pressure side is at least 1.3 times the diameter of the recess on the low pressure side.

13. Apparatus as set forth in claim 8 in which the stress relief is provided by providing an unbonded region in the interface between that one of said pair of plates on the high pressure side and said first plate, said region being peripheral to the cavity on the high pressure side.

14. Apparatus as set forth in claim 13 in which the unbonded region extends to a diameter which is more than 1.3 times the diameter of the cavity on the low pressure side.

* * * * *